United States Patent Office 2,876,157
Patented Mar. 3, 1959

2,876,157

PROCESS OF TREATING KETOSIS IN RUMINANTS

Rudolph Selden, Kansas City, Mo., assignor to Haver-Lockhart Laboratories, Incorporated, Kansas City, Mo., a corporation of California No Drawing. Application October 7, 1953
Serial No. 384,775

6 Claims. (Cl. 167—53)

This invention relates to improvements in the treatment of ketosis, an ailment quite common in ruminants, the primary object being to provide a process of administration of an effective, long-lasting material capable of offsetting ill effects of unbalanced diets or other causes of accumulation of ketone bodies in the blood stream characterizing the disease.

It is the most important object of this invention to provide a method of treatment for ketosis which consists of administering a substance including an ingredient capable of metabolizing into glucose by way of liver glycogen, whereby to induce a relatively slow reaction and thereby prolong the beneficial effects of the treatment over long periods of time.

Another important object hereof is to provide a treatment that includes subjecting the afflicted host to a selected dosage of a fast-acting carbohydrate such as glucose with one or more of the many slow-acting hexoses or hexitols to provide for immediate relief as well as prolonged benefits until the unbalanced conditions have become rectified.

To fully understand the principles of the present invention it is necessary to first recognize that disaccharides can be utilized by the body only if taken orally, while monosaccharides are absorbed also by simple diffusion—at different rates—if administered other than by mouth.

The portal blood carries the absorbed monosaccharides to the liver and muscle where they are converted to glycogen and stored. As the body requires energy for muscle contraction, muscle glycogen is used but is rapidly replenished by the liver glycogen which releases glucose into the systemic blood and is carried to the muscles to be again converted to glycogen. It is important to note that no sugar except glucose can be used directly for glycogen formation in the muscles.

Liver glycogen is changed directly to glucose by phosphorylation and carried as such to the muscles and other tissues as needed, but muscle glycogen is changed—via numerous intermediates—to pyruvic acid and (after reduction) to lactic acid. A part of the latter is transported to the liver and changed there to liver glycogen, while the rest of the lactic acid is oxidized to $CO_2$ and $H_2O$ with the production of energy. Thus, muscle glycogen is not a direct source of glucose, but liver glycogen is.

Carbohydrate metabolism is markedly influenced by a number of regulatory mechanisms of which the following are most important: (1) glucose concentration in the blood, tissue fluid, and tissues; (2) insulin; (3) adrenaline, or sympathico-adrenal mechanism; (4) anterior pituitary hormones; (5) hormones of the adrenal cortex; and (6) the hemostatic function of the liver. The first two are concerned primarily with the rate of glucose storage and oxidation; the third, fourth, and fifth primarily with mobilization of carbohydrate stores and of tissue substances for gluconeogenesis; and the last, with regulation of the general blood sugar supply.

Blood sugar is formed from other materials than carbohydrates (via glycogen), namely from hydrolyzed proteins and fats. However, in ruminants the gluconeogenic mechanism (i. e., the formation of glucose from noncarbohyrdate substances) is not as well developed as in other animals and man; therefore, fasting of cattle or sheep causes a marked fall in blood sugar which does not return to normal for several days after.

The abnormal carbohydrate metabolism, in human beings and animals, causes various derangements of the normal path outlined above; such as hyperglycemic (diabetic) and renal glucosurias, and hypoglycemia which often causes ketosis.

Ketosis, very common in cows especially well-nourished, high-producing animals, is characterized by an accumulation in the blood of significant amounts of so-called ketone bodies—i. e., beta-hydroxy-butyric acid and acetoacetic acid and their break-down product, acetone. The ketone bodies are normally produced in the liver as part of its fat metabolism and help meet the energy requirements of the animal; but if the production exceeds the capacity of the extrahepatic tissues to burn them up to $CO_2$ and $H_2O$, ketosis develops. This is true particularly when there is a carbohydrate deficiency due to inadequate diet or derangement of the carbohydrate metabolism. Ketosis can be produced experimentally by feeding an unbalanced diet high in fats and proteins and low in carbohydrates.

It has been shown that a certain amount of glucose and other anti-ketogenic factors, such as certain amino acids (whose non-nitrogenous residues are convertible to glucose), must be present in the system to oxidize completely the fatty acids of the fats and other ketogenic foods; the formation of the ketone bodies in the liver is regulated by hormones, especially one of the anterior pituitary lobe, namely, ACTH. Newer investigations indicate that a cow at parturition and under the demand of heavy lactation is subject to considerable stress; this results in a stimulation of the pituitary which releases the adrenocorticotropic hormone (ACTH). The cortisone-like hormones (gluco-corticoids) which are thus caused to be secreted by the adrenal cortex are of assistance to the cow in overcoming the stress. This is accomplished both by increasing the mobilization of glucose and by the formation of new glucose from proteins and fats. It is also probable that in a cow which develops ketosis, the stress becomes so excessive that the pituitary becomes temporarily exhausted, causing a failure of the adrenals to produce enough glucocorticoids; consequently, the blood sugar decreases.

In cases of increased fatty acid oxidation, a diminution of liver glycogen has been shown to result in an acceleration of ketone body formations; and if the amount of available ketone bodies is greater than is needed by the extrahepatic tissues, especially muscles, the symptoms of ketosis can soon be observed.

Liver glycogen is often low at a time when the demands for carbohydrate are greatest, particularly prior to parturition. Even in marked hypoglycemia the mammary gland continues to remove a normal quantity of glucose from the blood and it may not be possible to overcome the hypoglycemia by liberal feeding of glucose or molasses.

It is possible that most cases of the digestive type of ketosis develop slowly and become clinical only when the glycogen has been reduced to a certain level; mild cases recover promptly, others in from one to four days under appropriate treatment which has heretofore consisted chiefly of parenteral and oral administration of glucose. In the nervous type, the blood glucose is usually lowered more than 50%. The milk-fever type affects ruminants over four years of age; treatment has consisted of calcium and glucose therapy. There are other known therapies, from chloral hydrate to hormones, of no pertinency to the present invention and therefore, need not be further discussed.

Whenever ketosis is a matter of glucose shortage, as is the case with ruminants, the intravenous administration of glucose will be helpful in overcoming rapidly this deficiency in mild cases of the disease, but in most severe cases, and to make sure that the glucose need will be met for a prolonged period of time, I use other hexoses and hexitols which are slower in converting to liver glycogen than glucose, especially sorbitol. Sorbitol is water-soluble, non-toxic, and 60% as sweet as sucrose. According to my tests, it is stable to heat sterilization and compatible with the commonly used preservatives, such as phenol, formaldehyde, and chlorobutanol.

A new approach to the ketosis problem is based on the fact that the liver and the intestines are capable of transforming the hexoses other than glucose, as well as the hexitols to glucose which then enters into glycogenesis. While glucose has been commonly employed for treating ketosis, either injected or given orally, these other carbohydrates are much slower in converting into glycogen than is glucose.

Galactose, fructose (levulose) and mannose, the more slowly absorbed hexoses ($C_6H_{12}O_6$) are utilized exceedingly well as was initially proved with rabbits. As for the hexitols ($C_6H_{14}O_6$), sorbitol and mannitol and, to a limited extent, dulcitol are absorbed slowly.

To get more immediate and prolonged actions I have used mixtures of one or more hexitols with one or more hexoses, such as sorbitol and glucose, in proportions depending on the condition to be met. I injected products containing 50% glucose without sorbitol, 50% sorbitol without glucose, and mixtures containing varying amounts of glucose and sorbitol, totaling 50%, without ill effects. For instance, in sheep of 20 kilo body weight, I injected intravenously and subcutaneously up to 60 cc. of a 50% sorbitol solution and found that the blood level was very similar to that of 60 cc. of a 50% glucose solution, but the sorbitol curve ran lower at all times than that of glucose. The blood sugar curves for glucose and for sorbitol dropped in the animals tested below the normal after reaching peaks in about an hour and lows after three or four hours, but soon returned to normal levels. I also observed that in males, the blood levels were higher than in females.

When injected intraperitoneally, sorbitol is more effective, causing deposition of liver glycogen and, therefore, does not act as promptly as glucose which favors the deposition of muscle glycogen. The effectiveness of the method of the present invention is based on the knowledge that in rats, intraperitoneally administered sorbitol deposited over 20% more liver glycogen than glucose after six hours. When fed orally, large doses, even eight times as large as the parenteral dose above, did not produce any variations of blood levels outside the range of normal fluctuation. This may be due partially to the decreased rate of absorption of sorbitol from the gastrointestinal tract. It is (according to tests by Geiger counts) absorbed ten times slower than glucose and also, therefore, much more slowly oxidized, particularly for the first few hours after feeding.

My discoveries have led to the conclusion that another reason for the slow absorption of sorbitol may be found in the fact that fructose is an intermediate product in the sorbitol-glucose metabolism.

In cattle, I injected repeatedly 500 cc. and more of a solution containing 40% glucose and 5% sorbitol. To prolong the antiketogenetic action of the parenteral solution, its sorbitol content may be increased up to 70% total content and the glucose content decreased to an amount low enough to allow for a viscosity sufficiently high for making injections.

For oral use, where viscosity is of no importance, the sorbitol content may be increased up to 100%, if need be, and the glucose content decreased accordingly.

Administered by any route, sorbitol has been shown to be more anti-ketogenic than glucose or fructose. In addition, liver glycogen forms slowly from sorbitol in the following delayed process (particularly with the help of the enzyme sorbitol dehydrogenase): sorbitol—fructose (the oxidation product of sorbitol)—fructose-6-phosphate—glucose-6-phosphate—glucose-1-phosphate—glycogen (the polymerization product of glucose).

For these two reasons I have found that a hexitol such as sorbitol by itself or a hexose capable of metabolizing into glucose by way of liver glycogen, is of slow-acting therapeutic agent for the parenteral and oral use in the treatment of ketosis; to assure prompt as well as prolonged action, I prefer to use for the same purposes, and by any of the customary routes of administration, a mixture of any or more quick-acting carbohydrates such as glucose and one or more slow-acting materials within the class of sorbitol.

Having thus described the invention what is claimed as new and desired to be secured by Letters Patent is:

1. The process of treating ketosis in ruminants comprising injecting into the ruminant so afflicted an admixture of a glycogenetic agent capable of rapid conversion into muscle glycogen and a glycogenetic material requiring prolonged constructive catabolic glycogenesis in the liver prior to absorption of the glucose converted therefrom in the blood, said agent consisting essentially of glucose and said material being chosen from the group consisting of fructose, mannose, galactose, sorbitol, mannitol and dulcitol.

2. The process of treating ketosis in ruminants comprising injecting into the ruminant so afflicted an admixture of a glycogenetic agent capable of rapid conversion into muscle glycogen and a glycogenetic material requiring prolonged constructive catabolic glycogenesis in the liver prior to absorption of the glucose converted therefrom in the blood, said agent consisting essentially of glucose and said material consisting essentially of sorbitol.

3. The process of treating ketosis in ruminants comprising injecting into the ruminant so afflicted an admixture of a glycogenetic agent capable of rapid conversion into muscle glycogen and a glycogenetic material requiring prolonged constructive catabolic glycogenesis in the liver prior to absorption of the glucose converted therefrom in the blood, said agent consisting essentially of glucose and said material consisting essentially of fructose.

4. The process of treating ketosis in ruminants comprising injecting into the ruminant so afflicted an admixture of a glycogenetic agent capable of rapid conversion into muscle glycogen and glycogenetic material requiring prolonged constructive catabolic glycogenesis in the liver prior to absorption of the glucose converted therefrom in the blood, said agent consisting essentially of glucose and said material consisting essentially of mannose.

5. The process of treating ketosis in ruminants comprising injecting into the ruminant so afflicted an admixture of a glycogenetic agent capable of rapid conversion into muscle glycogen and glycogenetic material requiring prolonged constructive catabolic glycogenesis in the liver prior to absorption of the glucose converted therefrom in the blood, said agent consisting essentially of glucose and said material consisting essentially of mannitol.

6. The process of treating ketosis in ruminants comprising injecting into the ruminant so afflicted an admixture of a glycogenetic agent capable of rapid conversion into muscle glycogen and glycogenetic material requiring prolonged constructive catabolic glycogenesis in the liver prior to absorption of the glucose converted therefrom in the blood, said agent consisting essentially of glucose and said material consisting essentially of galactose.

References Cited in the file of this patent

Roepke: J. Am. Vet. Med. Assn., vol. 100, 1942, pp. 411–415.

Blakley: Biochem. Jour., vol. 52, October 1952, pp. 269–279 (pp. 269–273 and 278 relied on).

Woelffer: Hoard's Dairyman, vol. 97, No. 3, Feb. 10, 1952, p. 154.

The U. S. Dispensatory, 24th ed. (1947), Lippincott Co., Philadelphia, pp. 1135, 1603 and 1604.

Speel: Am. J. Pharmacy, April 1941, pp. 134–137.